(12) United States Patent
Huang et al.

(10) Patent No.: US 9,638,570 B2
(45) Date of Patent: May 2, 2017

(54) CALIBRATION METHOD FOR CAPACITANCE LEVEL SENSING APPARATUS AND ANTI-INTERFERENCE METHOD FOR PLURAL CAPACITANCE LEVEL SENSING APPARATUSES

(71) Applicant: FINETEK Co., Ltd., New Taipei (TW)

(72) Inventors: Yin-Lun Huang, New Taipei (TW); Chao-Kai Cheng, New Taipei (TW); Chi-Fan Liao, New Taipei (TW); Yi-Liang Hou, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 144 days.

(21) Appl. No.: 14/821,414

(22) Filed: Aug. 7, 2015

(65) Prior Publication Data
US 2017/0038242 A1  Feb. 9, 2017

(51) Int. Cl.
*G01F 25/00* (2006.01)
*G01F 23/26* (2006.01)

(52) U.S. Cl.
CPC ........ *G01F 25/0061* (2013.01); *G01F 23/263* (2013.01)

(58) Field of Classification Search
CPC .. G01F 25/0061; G01F 23/263; G01F 23/265; G01F 23/266; G01F 25/0076
See application file for complete search history.

(56) References Cited

U.S. PATENT DOCUMENTS

| | | | | |
|---|---|---|---|---|
| 6,510,397 B1 * | 1/2003 | Choe | ................... | F16H 57/0006 702/104 |
| 7,665,358 B2 * | 2/2010 | Calabrese | ............. | G01F 23/268 73/290 R |
| 7,946,148 B2 * | 5/2011 | Getman | ................ | G01F 23/263 324/601 |
| 8,109,126 B1 * | 2/2012 | Gibb | ..................... | G01F 23/266 73/1.73 |
| 8,161,814 B2 * | 4/2012 | Calcote | ................. | G01F 23/265 73/1.02 |
| 8,590,375 B2 * | 11/2013 | Farmanyan | ........... | G01F 23/263 324/668 |
| 8,869,587 B1 * | 10/2014 | Gibb | ..................... | G01F 23/266 73/1.73 |
| 9,170,144 B2 * | 10/2015 | Qi | ......................... | G01F 23/263 |

(Continued)

*Primary Examiner* — David A Rogers
(74) *Attorney, Agent, or Firm* — Muncy, Geissler, Olds & Lowe, P.C.

(57) ABSTRACT

A calibration method for a capacitance level sensing apparatus (10) is applied for a tank measurement. A measurement signal generating circuit (102) generates a measurement signal (104) to proceed with the tank measurement. According to a measurement result measured through the measurement signal (104), a sensing circuit (108) transmits a sensing signal (110) to a control unit (112). According to the sensing signal (110), the control unit (112) determines whether the sensing signal (110) is in an effective range or not. If the sensing signal (110) is in the effective range, the control unit (112) sets a total capacitance in accordance with the sensing signal (110) as a measurement base value. If the sensing signal (110) is not in the effective range, the control unit (112) controls the measurement signal generating circuit (102) to adjust a measurement frequency of the measurement signal (104).

7 Claims, 5 Drawing Sheets

(56) References Cited

U.S. PATENT DOCUMENTS

| | | | | |
|---|---|---|---|---|
| 9,395,716 B2* | 7/2016 | Bammer | ............. | A61M 5/1684 |
| 2004/0187570 A1* | 9/2004 | Williamson | .......... | G01F 23/266 |
| | | | | 73/304 C |
| 2005/0104604 A1* | 5/2005 | Mellert | .................... | G01L 9/12 |
| | | | | 324/678 |
| 2005/0263408 A1* | 12/2005 | Hazama | ............. | G01N 27/4175 |
| | | | | 205/775 |
| 2006/0277992 A1* | 12/2006 | Calabrese | ............. | G01F 23/268 |
| | | | | 73/304 R |
| 2007/0295056 A1* | 12/2007 | Calabrese | ............. | G01F 23/266 |
| | | | | 73/1.73 |
| 2009/0064757 A1* | 3/2009 | Calabrese | ............. | G01F 23/268 |
| | | | | 73/1.73 |
| 2012/0118059 A1* | 5/2012 | Reimer | ................ | F01N 3/2066 |
| | | | | 73/290 V |
| 2012/0167660 A1* | 7/2012 | Calcote | ................ | G01F 23/265 |
| | | | | 73/1.73 |
| 2013/0002269 A1* | 1/2013 | Dubery | ................... | G01D 1/00 |
| | | | | 324/686 |
| 2014/0007676 A1* | 1/2014 | Armstrong | ........... | G01F 23/265 |
| | | | | 73/304 C |

* cited by examiner

CALIBRATION METHOD FOR CAPACITANCE LEVEL SENSING APPARATUS AND ANTI-INTERFERENCE METHOD FOR PLURAL CAPACITANCE LEVEL SENSING APPARATUSES

BACKGROUND OF THE INVENTION

Field of the Invention

The present invention relates to a calibration method for a level sensing apparatus and an anti-interference method for plural level sensing apparatuses, and especially relates to a calibration method for a capacitance level sensing apparatus and an anti-interference method for plural capacitance level sensing apparatuses.

Description of the Related Art

The principle for the capacitance level sensing apparatus is as following. The measured material and the tank are deemed as an equivalent capacitor. When the sensing rod of the capacitance level sensing apparatus is covered by the measured material, the capacitance is generated, so that the circuit signal is changed. However, the accuracy of the capacitance level sensing apparatus is affected by a lot of factors and variables. Therefore, after the capacitance level sensing apparatus is arranged, the user has to adjust the capacitance level sensing apparatus by hands. It is inconvenient. Moreover, when plural capacitance level sensing apparatuses are used at the same time, the capacitance level sensing apparatuses interfere to each other. The accuracy of the capacitance level sensing apparatus is also affected by that.

SUMMARY OF THE INVENTION

In order to solve the above-mentioned problems, an object of the present invention is to provide a calibration method for a capacitance level sensing apparatus.

In order to solve the above-mentioned problems, another object of the present invention is to provide an anti-interference method for plural capacitance level sensing apparatuses.

In order to achieve the object of the present invention mentioned above, the calibration method is applied for a tank measurement and comprises following steps. A measurement signal generating circuit generates a measurement signal to proceed with the tank measurement. According to a measurement result measured through the measurement signal, a sensing circuit transmits a sensing signal to a control unit. According to the sensing signal, the control unit determines whether the sensing signal is in an effective range or not. If the control unit determines that the sensing signal is in the effective range, the control unit sets a total capacitance in accordance with the sensing signal as a measurement base value. If the control unit determines that the sensing signal is not in the effective range, the control unit controls the measurement signal generating circuit to adjust a measurement frequency of the measurement signal until the sensing signal is in the effective range. Then the control unit controls the measurement signal generating circuit to stop adjusting the measurement frequency of the measurement signal.

In order to achieve another object of the present invention mentioned above, the anti-interference method is applied for a tank measurement. The capacitance level sensing apparatus comprises a control unit, a measurement signal generating circuit and a sensing circuit. The anti-interference method comprises following steps. One of the capacitance level sensing apparatuses is selected as a selected capacitance level sensing apparatus. The control unit of the selected capacitance level sensing apparatus obtains a plurality of reference signal frequency values and a plurality of reference rod capacitances of the other capacitance level sensing apparatuses. According to the reference signal frequency values and the reference rod capacitances of the other capacitance level sensing apparatuses, the control unit of the selected capacitance level sensing apparatus calculates a plurality of reference equivalent capacitances between the selected capacitance level sensing apparatus and the other capacitance level sensing apparatuses respectively. The control unit of the selected capacitance level sensing apparatus calculates the reference equivalent capacitances and a rod capacitance of the selected capacitance level sensing apparatus to obtain a calculation result. The control unit of the selected capacitance level sensing apparatus multiplies the rod capacitance of the selected capacitance level sensing apparatus and a proportional constant to obtain a proportional rod capacitance. The control unit of the selected capacitance level sensing apparatus determines whether the calculation result is less than the proportional rod capacitance or not. If the control unit of the selected capacitance level sensing apparatus determines that the calculation result is less than the proportional rod capacitance, the selected capacitance level sensing apparatus is processed by the calibration method mentioned above. If the control unit of the selected capacitance level sensing apparatus determines that the calculation result is not less than the proportional rod capacitance, the selected capacitance level sensing apparatus is processed by the calibration method mentioned above. If the control unit of the selected capacitance level sensing apparatus determines that the sensing signal is not in the effective range, the control unit of the selected capacitance level sensing apparatus controls the measurement signal generating circuit of the selected capacitance level sensing apparatus to adjust a measurement frequency of the measurement signal. Moreover, a measurement frequency value of the measurement frequency of the measurement signal is not equal to the reference signal frequency values of the other capacitance level sensing apparatuses.

The advantage of the present invention is to calibrate the capacitance level sensing apparatus automatically, and to provide the anti-interference method for the capacitance level sensing apparatuses.

DETAILED DESCRIPTION OF THE INVENTION

Please refer to following detailed description and figures for the technical content of the present invention. The following detailed description and figures are referred for the present invention, but the present invention is not limited to it.

Figure 1:
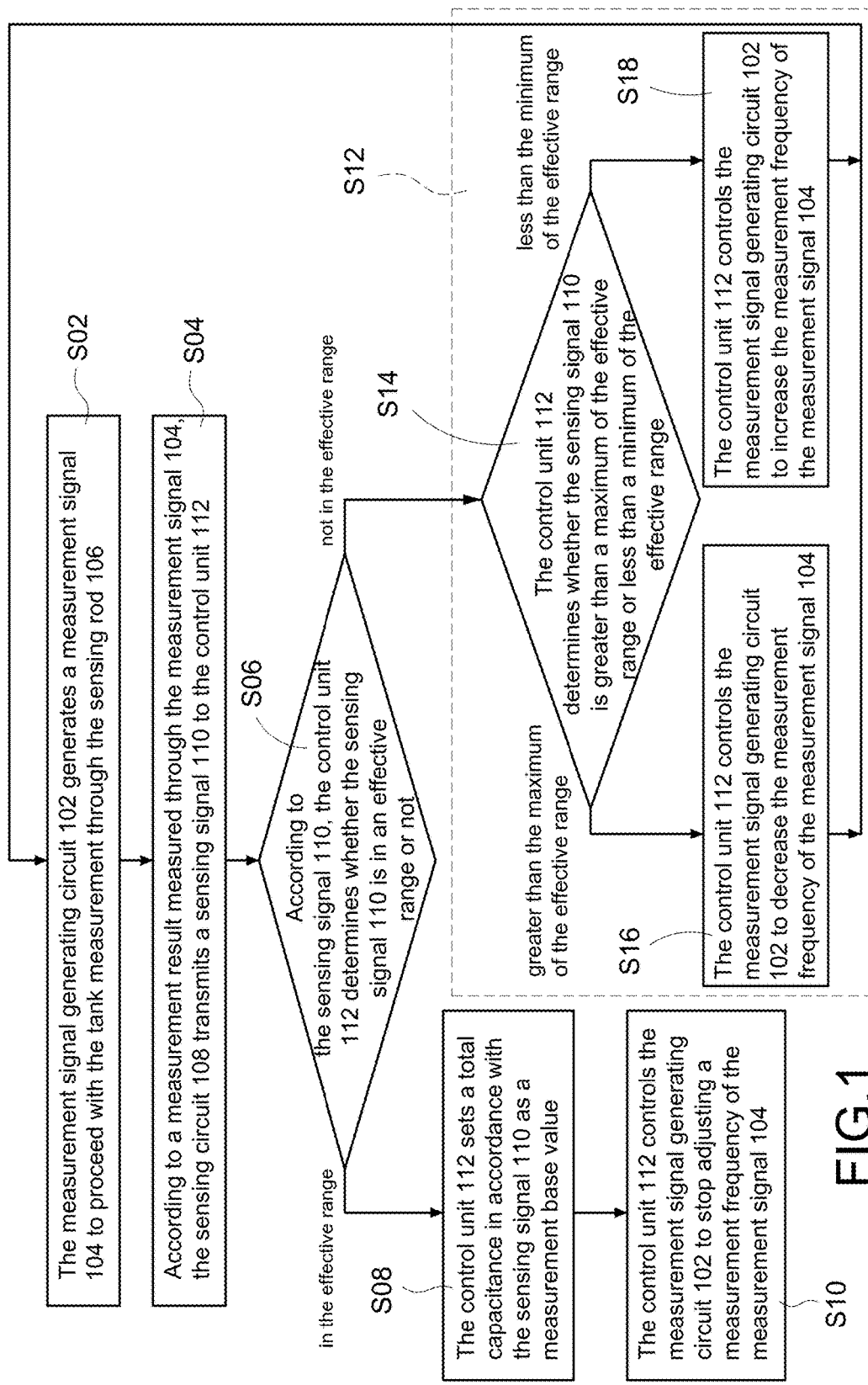
FIG. 1 shows a flow chart of the calibration method for the capacitance level sensing apparatus of the present invention.
Figure 2:
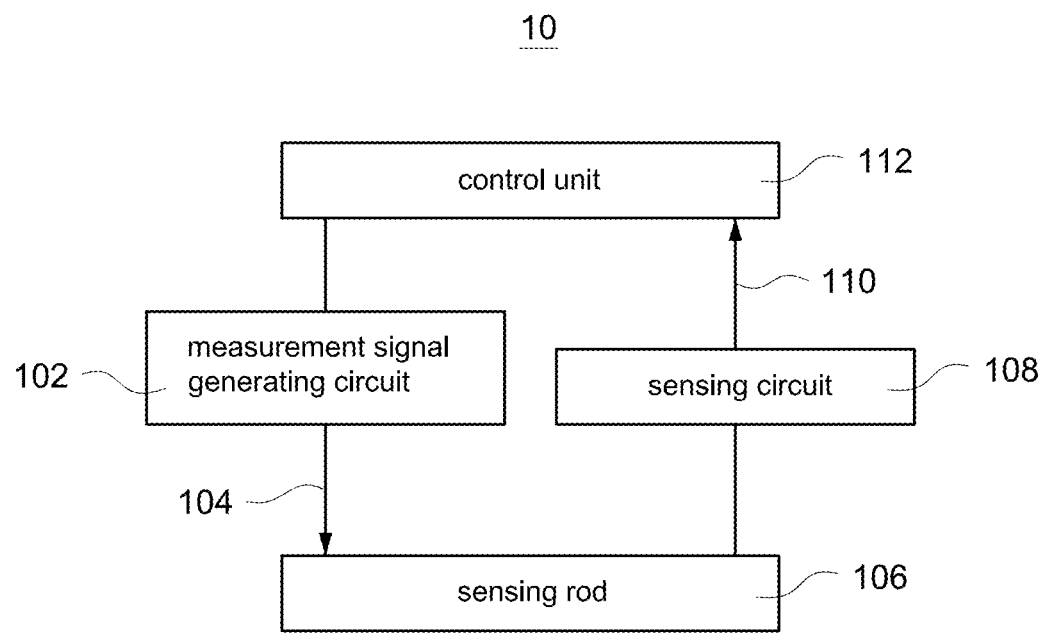
FIG. 2 shows a block diagram of the capacitance level sensing apparatus applied to the calibration method of the present invention.

FIG. 1 shows a flow chart of the calibration method for the capacitance level sensing apparatus of the present invention. FIG. 2 shows a block diagram of the capacitance level sensing apparatus applied to the calibration method of the present invention. A capacitance level sensing apparatus 10 comprises a measurement signal generating circuit 102, a sensing rod 106, a sensing circuit 108 and a control unit 112. The calibration method is applied for a tank measurement and comprises following steps.

S02: The measurement signal generating circuit 102 generates a measurement signal 104 to proceed with the tank measurement through the sensing rod 106. Then the calibration method goes to a step S04. Moreover, the measurement signal generating circuit 102 is a sine wave generating circuit.

S04: According to a measurement result measured through the measurement signal 104, the sensing circuit 108 transmits a sensing signal 110 to the control unit 112. Then the calibration method goes to a step S06.

S06: According to the sensing signal 110, the control unit 112 determines whether the sensing signal 110 is in an effective range or not. If the control unit 112 determines that the sensing signal 110 is in the effective range, the calibration method goes to a step S08. If the control unit 112 determines that the sensing signal 110 is in the effective range, the calibration method goes to a step S12.

S08: The control unit 112 sets a total capacitance in accordance with the sensing signal 110 as a measurement base value. Then the calibration method goes to a step S10.

S10: The control unit 112 controls the measurement signal generating circuit 102 to stop adjusting a measurement frequency of the measurement signal 104.

S12: The control unit 112 controls the measurement signal generating circuit 102 to adjust the measurement frequency of the measurement signal 104.

The step S12 comprises following steps.

S14: The control unit 112 determines whether the sensing signal 110 is greater than a maximum of the effective range or less than a minimum of the effective range. If the control unit 112 determines that the sensing signal 110 is greater than the maximum of the effective range, the calibration method goes to a step S16. If the control unit 112 determines that the sensing signal 110 is less than the minimum of the effective range, the calibration method goes to a step S18.

S16: The control unit 112 controls the measurement signal generating circuit 102 to decrease the measurement frequency of the measurement signal 104. Then the calibration method goes back to the step S02.

S18: The control unit 112 controls the measurement signal generating circuit 102 to increase the measurement frequency of the measurement signal 104. Then the calibration method goes back to the step S02.

Moreover, in the step S16 and in the step S18, the control unit 112 controls the measurement signal generating circuit 102 to decrease or increase the measurement frequency of the measurement signal 104 with a arithmetic method (namely, the measurement frequencies are a arithmetic progression; the measurement frequency is adjusted by a constant value for each time adjusting).

Figure 3:
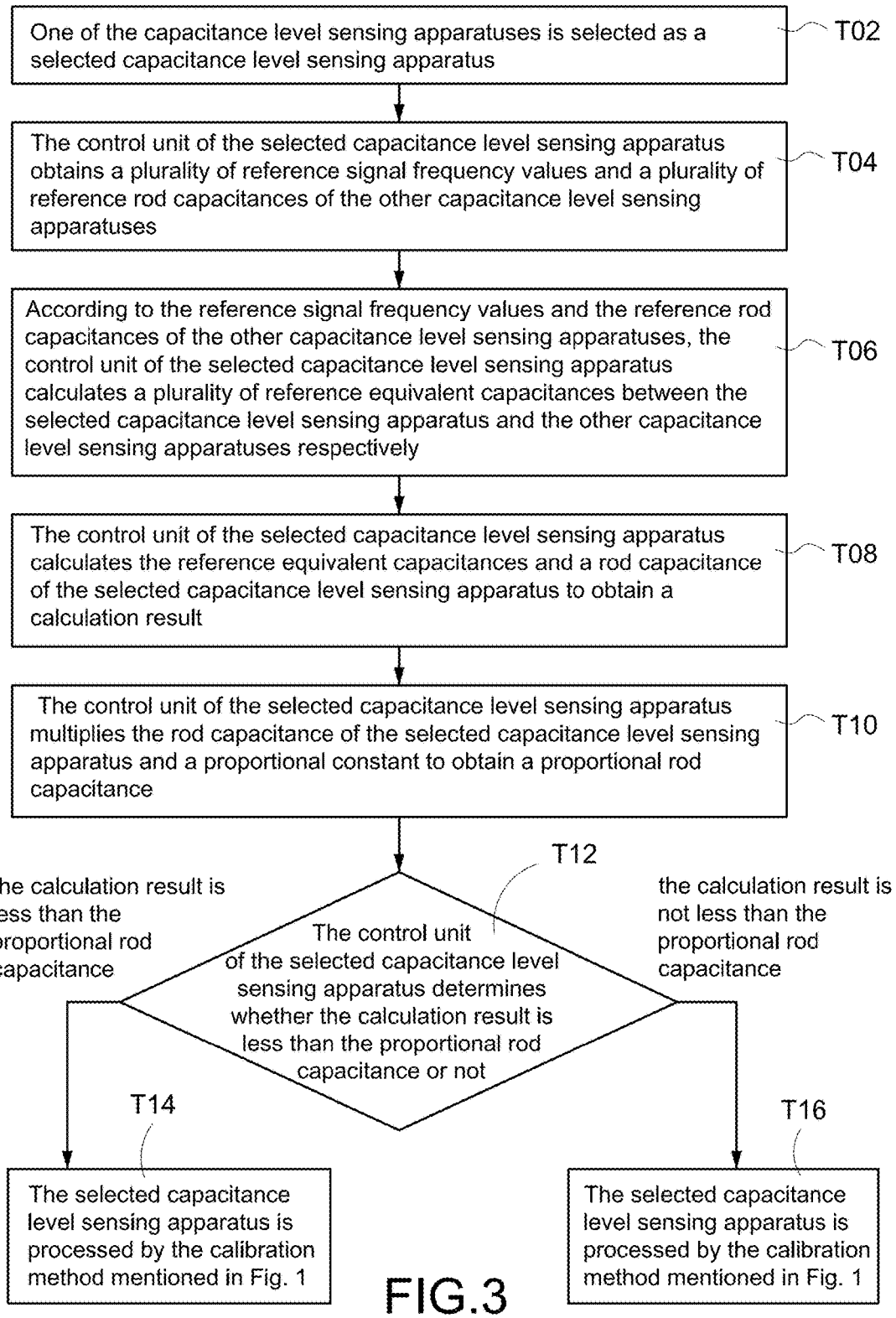
FIG. 3 shows a flow chart of the anti-interference method for the capacitance level sensing apparatuses of the present invention.
Figure 4:
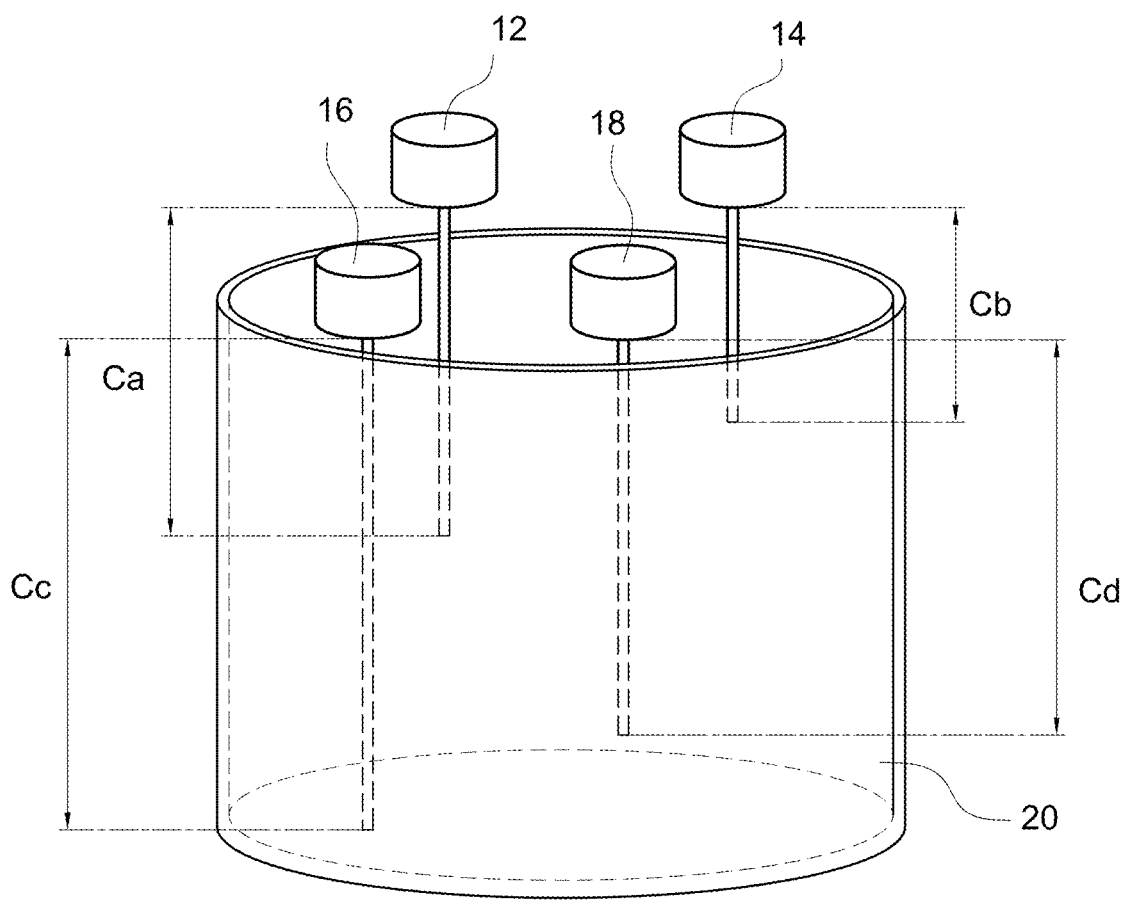
FIG. 4 shows a perspective drawing of the capacitance level sensing apparatuses applied to the anti-interference method of the present invention.
Figure 5:
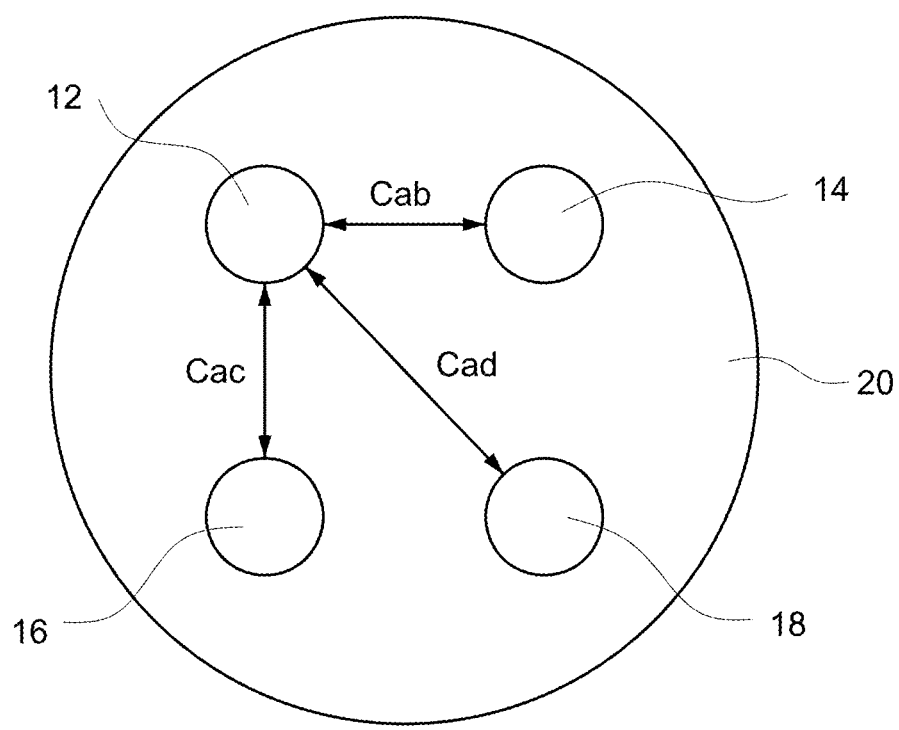
FIG. 5 shows a top view of the capacitance level sensing apparatuses applied to the anti-interference method of the present invention.

FIG. 3 shows a flow chart of the anti-interference method for the capacitance level sensing apparatuses of the present invention. FIG. 4 shows a perspective drawing of the capacitance level sensing apparatuses applied to the anti-interference method of the present invention. FIG. 5 shows a top view of the capacitance level sensing apparatuses applied to the anti-interference method of the present invention.

A first capacitance level sensing apparatus 12, a second capacitance level sensing apparatus 14, a third capacitance level sensing apparatus 16 and a fourth capacitance level sensing apparatus 18 are arranged in a tank 20. The first capacitance level sensing apparatus 12 has a first rod capacitance Ca. The second capacitance level sensing apparatus 14 has a second rod capacitance Cb. The third capacitance level sensing apparatus 16 has a third rod capacitance Cc. The fourth capacitance level sensing apparatus 18 has a fourth rod capacitance Cd. Because the types of the first capacitance level sensing apparatus 12, the second capacitance level sensing apparatus 14, the third capacitance level sensing apparatus 16 and the fourth capacitance level sensing apparatus 18 are different, the first rod capacitance Ca, the second rod capacitance Cb, the third rod capacitance Cc and the fourth rod capacitance Cd are different.

After the first capacitance level sensing apparatus 12, the second capacitance level sensing apparatus 14, the third capacitance level sensing apparatus 16 and the fourth capacitance level sensing apparatus 18 are arranged in the tank 20, plural reference equivalent capacitances are obtained due to distances between the first capacitance level sensing apparatus 12, the second capacitance level sensing apparatus 14, the third capacitance level sensing apparatus 16 and the fourth capacitance level sensing apparatus 18. For example, a first reference equivalent capacitance Cab is obtained between the first capacitance level sensing apparatus 12 and the second capacitance level sensing apparatus 14. A second reference equivalent capacitance Cac is obtained between the first capacitance level sensing apparatus 12 and the third capacitance level sensing apparatus 16. A third reference equivalent capacitance Cad is obtained between the first capacitance level sensing apparatus 12 and the fourth capacitance level sensing apparatus 18.

The anti-interference method for plural level sensing apparatuses (namely, the first capacitance level sensing apparatus 12, the second capacitance level sensing apparatus 14, the third capacitance level sensing apparatus 16 and the fourth capacitance level sensing apparatus 18) is applied for a tank measurement. The capacitance level sensing apparatus comprises a control unit, a measurement signal generating circuit and a sensing circuit. The anti-interference method comprises following steps.

T02: One of the capacitance level sensing apparatuses is selected as a selected capacitance level sensing apparatus. For example, the first capacitance level sensing apparatus 12 is selected as the selected capacitance level sensing apparatus. Then the anti-interference method goes to a step T04.

T04: The control unit of the selected capacitance level sensing apparatus obtains a plurality of reference signal frequency values and a plurality of reference rod capacitances (namely, the second rod capacitance Cb, the third rod capacitance Cc and the fourth rod capacitance Cd) of the other capacitance level sensing apparatuses. For example, the capacitance level sensing apparatuses sends the reference signal frequency values and the reference rod capacitances to a server (not shown in FIG. 4 or FIG. 5). The control unit of the selected capacitance level sensing apparatus obtains the reference signal frequency values and the reference rod capacitances of the other capacitance level sensing apparatuses through the server. Then the anti-interference method goes to a step T06.

T06: According to the reference signal frequency values and the reference rod capacitances of the other capacitance level sensing apparatuses, the control unit of the selected capacitance level sensing apparatus calculates a plurality of reference equivalent capacitances (namely, the first reference equivalent capacitance Cab, the second reference equivalent capacitance Cac and the third reference equivalent capacitance Cad) between the selected capacitance level sensing apparatus and the other capacitance level sensing apparatuses respectively. Then the anti-interference method goes to a step T08.

T08: The control unit of the selected capacitance level sensing apparatus calculates the reference equivalent capacitances and a rod capacitance of the selected capacitance level sensing apparatus to obtain a calculation result. Then the anti-interference method goes to a step T10.

For example, the control unit of the selected capacitance level sensing apparatus adds the reference equivalent capacitances and the rod capacitance of the selected capacitance level sensing apparatus to obtain the calculation result. Namely, the Cab+the Cac+the Cad+the Ca=the calculation result.

T10: The control unit of the selected capacitance level sensing apparatus multiplies the rod capacitance of the selected capacitance level sensing apparatus and a proportional constant (for example, 0.99) to obtain a proportional rod capacitance. For example, the proportional rod capacitance=the Ca*0.99. Then the anti-interference method goes to a step T12.

T12: The control unit of the selected capacitance level sensing apparatus determines whether the calculation result is less than the proportional rod capacitance or not. Namely, determines whether the Cab+the Cac+the Cad+the Ca is less than the Ca*0.99 or not. If the control unit of the selected capacitance level sensing apparatus determines that the calculation result is less than the proportional rod capacitance, the anti-interference method goes to a step T14. If the control unit of the selected capacitance level sensing apparatus determines that the calculation result is not less than the proportional rod capacitance, the anti-interference method goes to a step T16.

T14: The selected capacitance level sensing apparatus is processed by the calibration method mentioned in FIG. 1.

T16: The selected capacitance level sensing apparatus is processed by the calibration method mentioned in FIG. 1.

Moreover, when the anti-interference method goes to FIG. 1 from the step T16, if the control unit of the selected capacitance level sensing apparatus determines that the sensing signal is not in the effective range, the control unit of the selected capacitance level sensing apparatus controls the measurement signal generating circuit of the selected capacitance level sensing apparatus to adjust the measurement frequency of the measurement signal (namely, the step S12). Moreover, a measurement frequency value of the measurement frequency of the measurement signal is not equal to the reference signal frequency values of the other capacitance level sensing apparatuses. The measurement frequency of the measurement signal is adjusted serially (namely, in series; one by one) and is decreased or increased by a specific value, wherein the specific value is at least greater than a percent (namely, 1%; 1/100) of a signal frequency value of the selected capacitance level sensing apparatus.

The advantage of the present invention is to calibrate the capacitance level sensing apparatus automatically, and to provide the anti-interference method for the capacitance level sensing apparatuses.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A calibration method for a capacitance level sensing apparatus (10) applied for a tank measurement, the calibration method comprising:
   a. a measurement signal generating circuit (102) generating a measurement signal (104) to proceed with the tank measurement;
   b. according to a measurement result measured through the measurement signal (104), a sensing circuit (108) transmitting a sensing signal (110) to a control unit (112);
   c. according to the sensing signal (110), the control unit (112) determining whether the sensing signal (110) is in an effective range or not;
   d. if the control unit (112) determines that the sensing signal (110) is in the effective range, the control unit (112) setting a total capacitance in accordance with the sensing signal (110) as a measurement base value; and
   e. if the control unit (112) determines that the sensing signal (110) is not in the effective range, the control unit (112) controlling the measurement signal generating circuit (102) to adjust a measurement frequency of the measurement signal (104) until the sensing signal (110) is in the effective range, and then the control unit (112) controlling the measurement signal generating circuit (102) to stop adjusting the measurement frequency of the measurement signal (104).

2. The calibration method in claim 1, wherein the step e comprises:
   e1. if the control unit (112) determines that the sensing signal (110) is greater than a maximum of the effective range, the control unit (112) controlling the measurement signal generating circuit (102) to decrease the measurement frequency of the measurement signal (104).

3. The calibration method in claim 2, wherein the step e further comprises:
   e2. if the control unit (112) determines that the sensing signal (110) is less than a minimum of the effective range, the control unit (112) controlling the measurement signal generating circuit (102) to increase the measurement frequency of the measurement signal (104).

4. The calibration method in claim 3, wherein in the step e1 and in the step e2, the control unit (112) controls the measurement signal generating circuit (102) to decrease or increase the measurement frequency of the measurement signal (104) with a arithmetic method.

5. An anti-interference method for plural capacitance level sensing apparatuses (12, 14, 16, 18) applied for a tank measurement, the capacitance level sensing apparatus (12, 14, 16, 18) comprising a control unit (112), a measurement signal generating circuit (102) and a sensing circuit (108), the anti-interference method comprising:
   p. selecting one of the capacitance level sensing apparatuses (12, 14, 16, 18) as a selected capacitance level sensing apparatus (12);
   q. the control unit (112) of the selected capacitance level sensing apparatus (12) obtaining a plurality of reference signal frequency values and a plurality of reference rod capacitances (Cb, Cc, Cd) of the other capacitance level sensing apparatuses (14, 16, 18);

r. according to the reference signal frequency values and the reference rod capacitances (Cb, Cc, Cd) of the other capacitance level sensing apparatuses (14, 16, 18), the control unit (112) of the selected capacitance level sensing apparatus (12) calculating a plurality of reference equivalent capacitances (Cab, Cac, Cad) between the selected capacitance level sensing apparatus (12) and the other capacitance level sensing apparatuses respectively (14, 16, 18);

s. the control unit (112) of the selected capacitance level sensing apparatus (12) calculating the reference equivalent capacitances (Cab, Cac, Cad) and a rod capacitance (Ca) of the selected capacitance level sensing apparatus (12) to obtain a calculation result;

t. the control unit (112) of the selected capacitance level sensing apparatus (12) multiplying the rod capacitance (Ca) of the selected capacitance level sensing apparatus (12) and a proportional constant to obtain a proportional rod capacitance;

u. the control unit (112) of the selected capacitance level sensing apparatus (12) determining whether the calculation result is less than the proportional rod capacitance or not;

v. if the control unit (112) of the selected capacitance level sensing apparatus (12) determines that the calculation result is less than the proportional rod capacitance, the selected capacitance level sensing apparatus (12) being processed by the calibration method in claim 1;

w. if the control unit (112) of the selected capacitance level sensing apparatus (12) determines that the calculation result is not less than the proportional rod capacitance, the selected capacitance level sensing apparatus (12) being processed by the calibration method in claim 1; and x. if the control unit (112) of the selected capacitance level sensing apparatus (12) determines that the sensing signal (110) is not in the effective range, the control unit (112) of the selected capacitance level sensing apparatus (12) controlling the measurement signal generating circuit (102) of the selected capacitance level sensing apparatus (12) to adjust the measurement frequency of the measurement signal (104), wherein a measurement frequency value of the measurement frequency of the measurement signal (104) is not equal to the reference signal frequency values of the other capacitance level sensing apparatuses (14, 16, 18).

6. The anti-interference method in claim 5, wherein in the step s, the control unit (112) of the selected capacitance level sensing apparatus (12) adds the reference equivalent capacitances (Cab, Cac, Cad) and the rod capacitance (Ca) of the selected capacitance level sensing apparatus (12) to obtain the calculation result.

7. The anti-interference method in claim 6, wherein in the step x, the measurement frequency of the measurement signal (104) is adjusted serially and is decreased or increased by a specific value; the specific value is at least greater than a percent of a signal frequency value of the selected capacitance level sensing apparatus (12).

* * * * *